United States Patent [19]

Down

[11] Patent Number: 5,132,015

[45] Date of Patent: Jul. 21, 1992

[54] FLOW CONTROL FOR ULTRA FILTRATION SYSTEMS

[75] Inventor: Peter E. Down, Andover, Mass.

[73] Assignee: Rohm and Haas Company, Philadelphia, Pa.

[21] Appl. No.: 592,104

[22] Filed: Oct. 4, 1990

[51] Int. Cl.⁵ .............................................. B01D 61/22
[52] U.S. Cl. ................................ 210/637; 210/321.65
[58] Field of Search ............... 210/637, 634, 636, 644, 210/649-652, 321.65, 321.69

[56] References Cited

U.S. PATENT DOCUMENTS 4,968,429 11/1990 Yen ..................................... 210/637

Primary Examiner—Frank Sever

[57] ABSTRACT

An ultrafiltration system with a recirculating closed loop design and a feed control valve outside the loop which admits feed to the loop under permeate level control was shown to be operable with a constant recirculation flow thus minimizing membrane fouling. A fast flush was also possible without closing the permeate valve.

2 Claims, 2 Drawing Sheets

FLOW CONTROL FOR ULTRA FILTRATION SYSTEMS

FIELD OF THE INVENTION

This invention relates to an improved separation system and its method of operation for the separation of solutes, colloidal particles, or suspended matter from solutions or suspensions containing the same. In a preferred embodiment, this invention relates to a membrane filtration system that can be operated with a constant recirculation flow which minimizes membrane fouling. Transmembrane pressure is uncoupled from recirculation; and fast flushing, which is customarily used to clean hollow fiber membranes, is possible without restricting the permeate flow by closing the permeate valve.

BACKGROUND OF THE INVENTION

Separation techniques such as reverse osmosis, ultrafiltration and microfiltration are widely used today in industry. Many advantages have been realized by employing these techniques, among which are the reduction in time required for effecting separation, efficiency in separation, the use of mild operating conditions such as room temperature separations, the reduction in operating costs as compared to older techniques such as evaporation, chemical precipitation, and ultracentrifugation, and the capability to separate species previously considered inseparable. The present invention is particularly concerned with membrane separations by ultrafiltration techniques, although it can be applied to some of the other above-mentioned separation techniques.

Ultrafiltration and microfiltration are separation processes wherein a solution or suspension containing a solute, colloidal particle or suspended particle of greater dimensions than the solvent it is dissolved in, is fractionated by being subjected to such pressure as to force the solvent through a porous filter, particularly a polymeric membrane (see for example U.S. Pat. Nos.; 3,615,024; 3,526,588; 3,556,305; 3,541,005; and 3,549,016; all of which are hereby incorporated herein by reference to be generally illustrative of the types of polymeric membranes contemplated), although the filter can be of the nonpolymeric type such as ceramic. The membranes used in ultrafiltration or microfiltration may be of various configurations such as hollow fiber, flat sheet, spiral wound or tubular. Preferably, for the purposes of the present invention, hollow fiber polymeric membranes are employed.

Membrane separation systems are usually operated in a crossflow mode whereby the process fluid flow (i.e. the "feed stream" to be separated) is tangential to the surface of the polymeric membrane. That is, the process fluid to be treated enters the separation module via the process fluid inlet, flows parallel to the surface of the membrane on the same side as the process fluid inlet and outlet are located, leaves the separation module via the process fluid outlet, and optionally, is recycled back to the separation module for further treatment. A portion of the process fluid passes through the membrane as permeate. This type of separation module may be used for various purposes such as; to concentrate a fluid, in which case the desired product is the fluid leaving the separator through the process fluid outlet; to purify a fluid, in which case the desired product can be the permeate or the fluid leaving the separator through the process fluid outlet; or to separate one or more components from a fluid, in which case the desired product may be the fluid passing through the membrane as permeate, the fluid leaving the separator through the process fluid outlet, the component(s) retained by the membrane, or combination thereof. During use, the side of the membrane contacting the process fluid can become fouled by material retained by the membrane. Such fouled membranes can be cleaned for reuse by such techniques as; mechanical cleaning, the removal of foulant material by, for example, using a brush, rod or sponge; fast-flush, the pumping of fluid across the fouled surface of the membrane at high flow rate to physically dislodge and remove the foulant; fast-flush with reverse flow, the pumping of fluid across the fouled surface of the membrane at high flow rate with periodic reversal of the flow direction to physically dislodge and remove the foulant; chemical cleaning, the contacting of the fouled surface of the membrane with a chemical cleaning fluid; pressure backwash, the pumping of fluid, for example permeate or water, under pressure through the membrane from the permeate side to the process fluid side such that the fluid physically dislodges and removes foulant material from the surface of the membrane; or a combination of two or more of the above-mentioned techniques.

In the above-described techniques of fast-flush, chemical cleaning and pressure backwashing, pressure is usually created by means of a pump. This can give rise to hydraulic pressure surges that can damage the membrane. Therefore, it is important that the fluid pressure is carefully controlled so the pressure difference between the fluid on one side of the membrane and that on the other side of the membrane does not exceed the maximum allowable transmembrane pressure difference for that particular membrane. The maximum allowable transmembrane pressure difference for a particular membrane is the maximum pressure difference between opposite sides of a membrane that can be accommodated by the membrane without damage resulting.

Certain membrane configurations with narrow process fluid flow paths may become severely fouled, whereby the foulant restricts or even prevents the free flow of process fluid across the membrane surface. If this occurs, the fast-flush and chemical cleaning techniques may be insufficient to adequately clean the membrane, and mechanical cleaning and/or pressure backwashing may be required to achieve satisfactory cleaning. However, mechanical cleaning may be impractical for these membrane configurations because of their narrow process fluid flow paths, and pressure backwashing, as discussed above, has the disadvantages of; having to carefully control the pressure of the fluid in order to avoid damage to the membranes; and the addition of extra pumping capacity which adds to both the initial cost of the system and to the overall operating cost of the system.

The system design described in copending U.S. patent application No. 331,471 and the operation of this system described in copending U.S. patent application No. 331,476 (both commonly assigned to the same assignee as the present invention) solves the problem of hydraulic pressure surges leading to damaged fibers. A suction backwash procedure or vacuflush is described in the above-mentioned patent applications to aid in the cleaning of the membranes. To activate the suction backwash procedure, a permeate pump is used to draw permeate through the hollow fibers by way of the process lines.

An essential part of many separation techniques, as in membrane filtration, is the ability to keep the filtrate separate from the feed and thereby avoid mixing the permeate with the process fluid. This is beneficial in applications where the filtrate stream must remain sanitary, such as in food or pharmaceutical applications, or where the feed stream can contaminate the filtrate, such as in waste applications.

U.S. patent application No. 433,888 (commonly assigned to the same assignee as the present invention) provides a separation system that reduces the equipment and/or energy requirements associated with such systems and is capable of operating in many of the modes of operation of a separation system, including suction backwash, while keeping the filtrate stream separate from the process stream.

U.S. patent applications No. 433,888, 331,471 and 331,476 are hereby incorporated herein by reference.

BRIEF DESCRIPTION OF THE DRAWINGS

This invention will now be more fully explained with reference to FIGS. 1-2 appended hereto.

Figure 1:
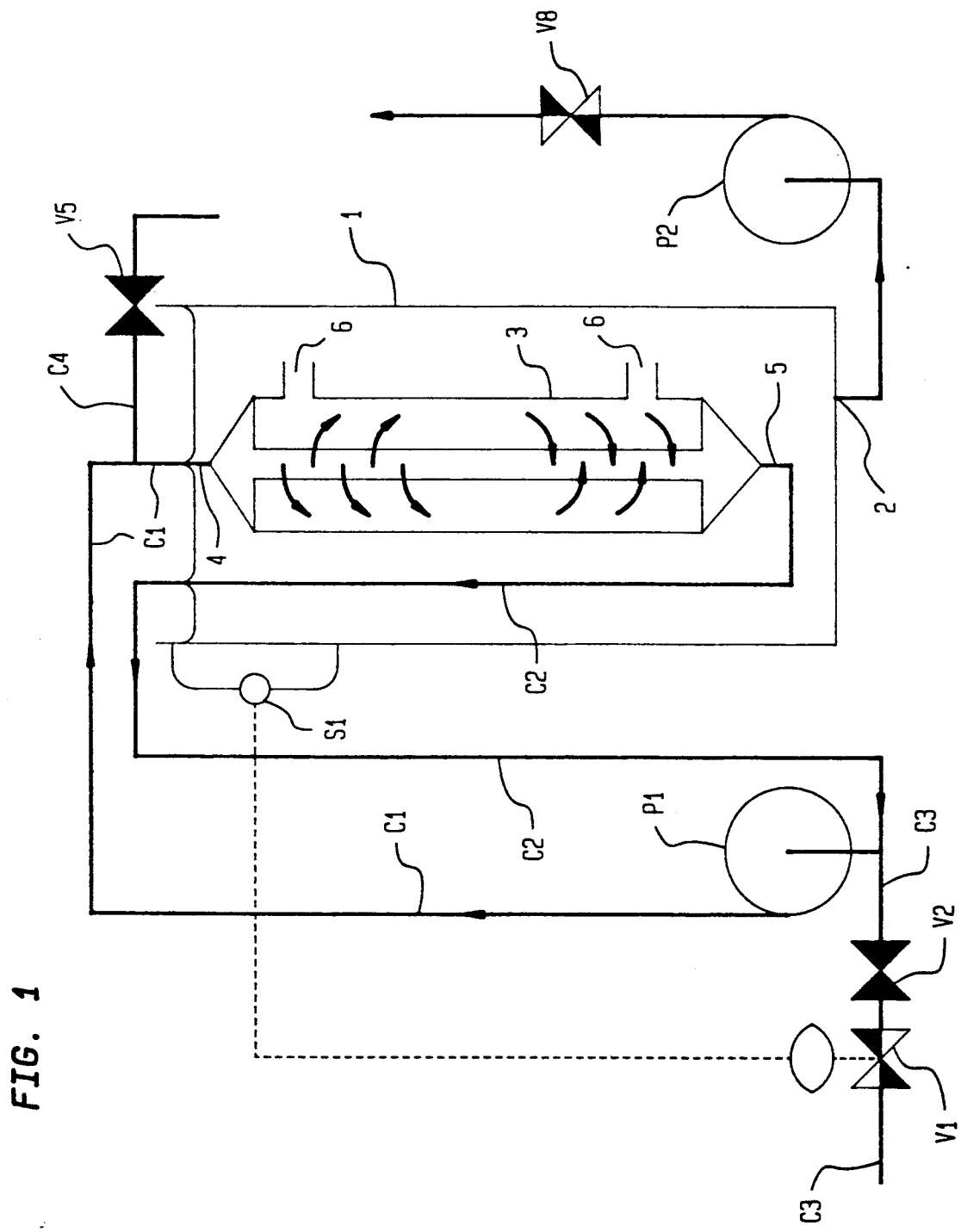
FIG. 1 is a schematic representation of the separation system of this invention operating in a fast flush mode.
Figure 2:
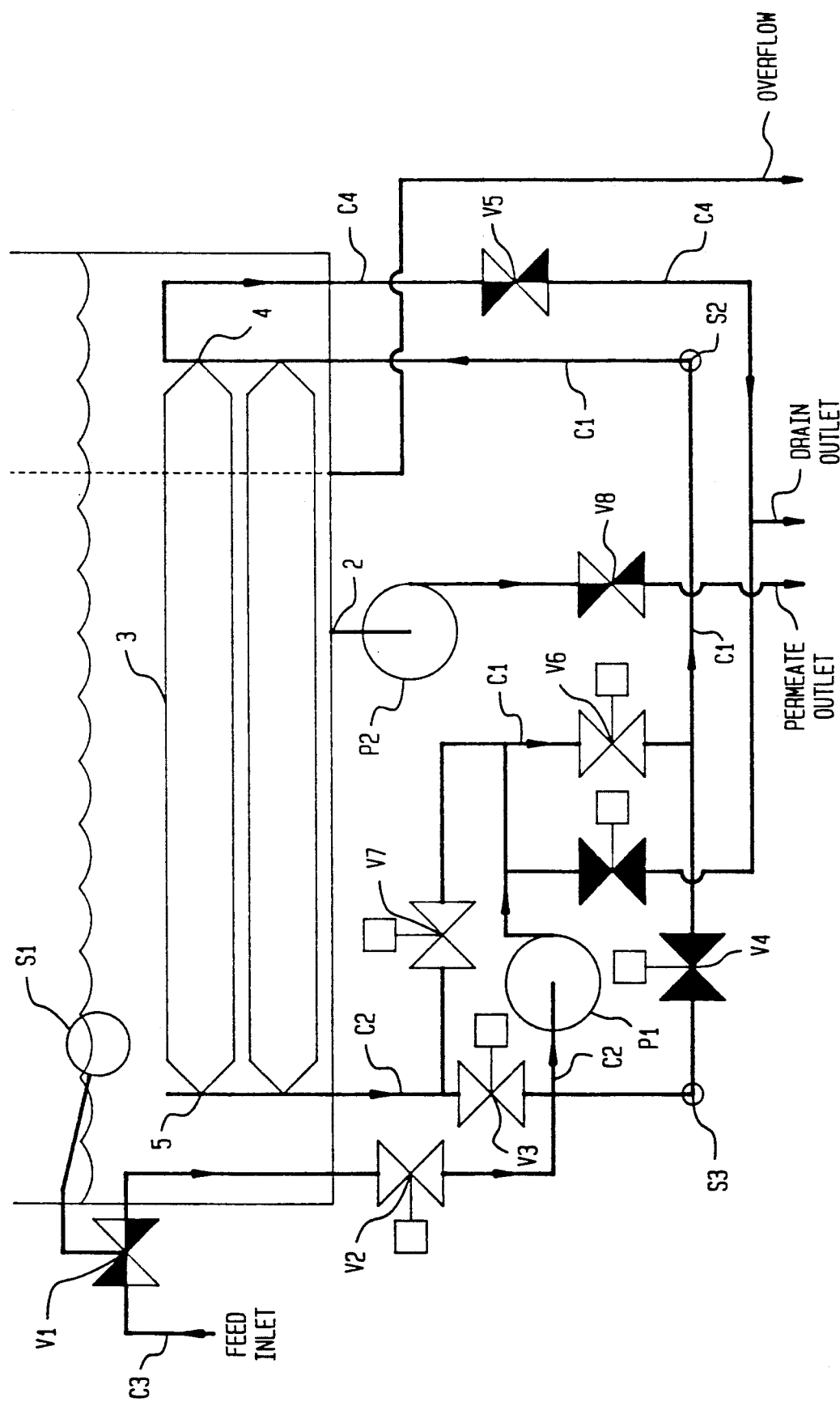
FIG. 2 is a schematic representation of the preferred mode of the separation system of this invention, operating in a steady state condition.

Bold conduit lines in FIG. 1 and 2 indicate flow of process fluid in the depicted mode of operation.

DETAILED DESCRIPTION OF THE INVENTION

A novel, simple and economical membrane separation system is described herein which can operate in many of the standard modes of operating a membrane separation system such as: (a) normal flow of the process side fluid during filtration; (b) reverse flow of the process side fluid during filtration; (c) normal flow of the process side fluid during filtration with filtrate recycle, the isolation and return of the filtrate to the process side; (d) reverse flow of the process side fluid during filtration with filtrate recycle; (e) suction backwash with the backwash liquor exiting the process side flow channels simultaneously in the normal flow and reverse flow directions; (f) suction backwash with the backwash liquor exiting the process side flow channel in the normal flow direction; (g) suction backwash with the backwash liquor exiting the process side flow channel in the reverse flow direction. Furthermore, this invention allows for the operation in many of the operating modes, especially in the suction backwash mode, without requiring the suction backwash fluid to contact and contaminate the filtrate fluid with process fluid debris.

This system can be operated with a constant recirculation flow which minimizes or prevents membrane fouling. Transmembrane pressure is uncoupled from recirculation and a fast flush is possible without restricting the flow of permeate from the system.

The apparatus of this invention comprises:

(a) One or more separation modules, each module having an inlet and an outlet for process fluid and an outlet for permeate, said separation module(s) being located within a container for permeate, said container having a means to remove permeate;

(b) A pressure means having an inlet and an outlet, said pressure means outlet being connected by a first conduit means to one or more said separation module process fluid inlets, said separation module process outlets being connected by a second conduit means to said pressure means inlet thereby forming a loop;

(c) A process fluid supply means, said process fluid supply means being connected to said second conduit means by a third conduit means, the flow through said third conduit means being controlled by a first valve (V1 in FIG. 1);

(d) A permeate level sensing means, said sensing means being positioned to sense the level of permeate within said permeate container and being operably connected to a valve control means, said valve control means being positioned to control said first valve.

In a preferred embodiment, this invention further comprises a fourth conduit means connected to said first conduit means, said fourth conduit means being controlled by a second valve (V5 in FIG. 1), said second valve providing a bleed of said process fluid on the high pressure side of said loop, usually to a drain.

Under normal operation, suspended solids may tend to build up in the recirculation loop. This condition may be alleviated by allowing a percentage of the recirculating process fluid to bleed from the high pressure side and out of the system, thus removing some of the suspending solids and preventing plugging of the system. The preferred bleed rate is about 10% of the recirculation flow.

In contrast to conventional filter systems, the bleed must be on the high pressure side of the recirculation loop because under certain operating conditions in the present system, the low pressure side of the loop has less than atmospheric pressure and would not be suitable for a bleed.

In a more preferred embodiment this invention comprises a plurality of conduit junctions connected to the first and second, conduit means, said conduit junctions being connected together by a plurality of valved conduits to permit the introduction of said process fluid to said separation modules in either forward or reverse flow directions and providing for negative pressure on said process fluid inlet or outlet of said separation modules.

In another aspect, this invention comprises:

A method of operating a membrane separation system comprising:

a) inducing flow of process fluid through one or more separation modules in a continuous, recirculating loop, said separation modules being submerged in permeate;

b) introducing fresh process fluid to said loop in response to a lowered level of said permeate.

In a preferred mode, the method of operating a membrane separation system further comprises:

bleeding a portion of the recirculating process fluid from the higher pressure side of said loop, thereby removing suspended solids from said loop.

In yet another aspect, this invention comprises a method of cleaning a membrane separation system located within a continuous, recirculating loop comprising:

a) closing the feed valve;
b) forward flushing said system;
c) reverse flushing said system;
d) vacuum flushing said system.

The process side of the membrane module is the side where the process fluid comes into contact with the membrane surface. The process fluid is carried from the recirculating pump to the process side of the membrane module by way of the process fluid (first) conduit. Upon leaving the membrane module the process fluid has lost a portion of its solvent as permeate, and therefore as the process fluid leaves the membrane module it is more concentrated in the components of larger size than the pores of the membrane. As used herein, the term "permeate" refers to the stream passing through the membrane surface and the term "concentrate" or "process fluid" defines the portion of the process fluid stream exiting the membrane module on the process side containing the retained, non-permeating species. The concentrate is carried away from the module in the concentrate fluid (second) conduit and returned to the inlet of the recirculating pump, thus completing a loop.

Fresh process fluid enters the inlet side of the recirculating pump under control of a control valve (V1 in FIG. 1) which in turn is controlled by a control means which is activated by a means for sensing the level of permeate in the permeate container. When the level of permeate is low, V1 is fully open; when the permeate rises to the desired level, V1 is automatically closed.

The sensing means and value control means may be either mechanical or electronic. For example, a brass float valve was found to be suitable as illustrated in Example 1. Those of ordinary skill in the art will be able to identify other suitable sensing and control means.

Optionally, a feed valve (V2) may be located in conduit (C-3) down stream of valve (V1). This permits the process feed to be shut-off independently of the level of permeate; as for example in the fast flush cycle.

A separation module as discussed herein includes conventional membrane cartridges such as containers housing membranes within a solid outer wall having one or more permeate outlets. The solid outer wall is so spaced from the membranes as to enable the permeate to collect and surround the membrane. The cartridges can be connected with a process fluid inlet, concentrate outlet and the permeate can flow into a tank surrounding the cartridge. A single cartridge can be used or multiple cartridges can be connected to a manifold to allow for the cartridges to be run in series and/or parallel configuration. The cartridges are suspended in a tank, and the permeate allowed to flow into said tank which surrounds the membrane module or modules. The permeate is then subsequently carried off as required.

"Pressure means" refers to a way of applying pressure, for example, a pump, to move the process fluid through the system.

"Conduit means" refers to equipment, such as a pipe, which can be used to transport fluid from one point to another under pressure which may be higher or lower than atmospheric.

"Vacuflush", "suction backwash" or "vacuum flushing" refers to a method of cleaning a membrane separation system comprising one or more membranes, which method comprises inducing flow of liquid through the or each membrane by creating a pressure less than atmospheric pressure on the fouled side of the or each membrane while maintaining substantially atmospheric pressure on said fluid on the other side of the or each membrane.

The present invention combines the advantages of U.S. patent application Ser. Nos. 331,471, pending and 433,888, pending and additionally provides a constant recirculation flow which prevents or minimizes membrane fouling. Transmembrane pressure is uncoupled from recirculation and a fast flush is possible without restricting permeate flow from the system.

FIG. 1 is a schematic representation of the present invention operating in the fast flush mode.

The control valve (V1) and the feed valve (V2) are closed and the recirculating pump (P1) pumps fluid through the conduit (C1) through the inlet (4) to the separation module (3). Fluid is taken from the outlet (5) and returned to the pump (P1) via the conduit (C2). A bleed valve (V5) is provided on the high pressure side of the coop. If the recirculating pump is, for example, designed to produce a 25 pounds per square inch gauge (psig) inlet and a 5 psig outlet cartridge differential pressure (20 psig) at maximum flow rate, the differential pressure will remain the same, independent of the feed rate. When the feed valve is closed as in the fast flush mode, the average transmembrane pressure will become zero. As the recirculation flow is unchanged, the cartridge inlet pressure will drop to 10 psig and the outlet pressure to $-10$ psig. This is termed the fast flush condition which generates permeate in the high pressure half of the fiber and backflushing in the low pressure half of the fiber.

In the preferred mode of the separation system the direction of fast flush may be reversed so that back flushing occurs in the opposite half of the separation module, thus cleaning the entire length of the fibers.

The preferred separation system is illustrated in FIG. 2 in the normal operating mode. Process fluid enters the system through conduit (C3) and valve (V1) which is controlled by the permeate level in the tank (1). Sensor (S1) and a valve control means (not shown) close the valve (V1) when the permeate level reaches the desired level and open it when the permeate level falls.

Fluid passes through conduit (C3) into conduit (C2) just prior to entry to the recirculating pump (P1). The fluid then is pumped through conduit (C1) to the inlet (4) of separation module (3). A bleed valve (V5) is provided on the high pressure side of the loop. While passing through the separation module, permeate passes through the wall of the fiber and enters the tank through outlet (6) (not shown in FIG. 2). Concentrate is returned to the pump through outlet (5) and conduit (C2) thus forming a loop. Permeate may be drawn off the tank by the permeate pump (P2) as required.

Valve settings for normal operation, forward fast flush and reverse fast flush are shown in Table I. Valve numbers are as depicted in FIGS. 1 and 2.

TABLE I

| Valve # | Normal | Fast Flush Forward | Fast Flush Reverse |
|---|---|---|---|
| V1 (Cntrl Valve) | Depends on Permeate Level | Depends on Permeate Level | Depends on Permeate Level |
| V2 (Feed Valve) | Open | Closed | Closed |
| V3 | Open | Open | Closed |
| V4 | Closed | Closed | Open |
| V5 (Bleed Valve) | Partially Open | Closed | Closed |
| V6 | Open | Open | Closed |
| V7 | Closed | Closed | Open |
| V8 (Permeate Outlet) | Open | Optional | Optional |

The following example is intended to illustrate the present invention, but not to limit it in any way.

EXAMPLE 1

The separation system as illustrated in FIG. 2 was constructed using four GM-80 cartridges (available from Romicon, Inc., Woburn, MA) using a G&L Model NPE close coupled centrifugal, recirculation pump (available from Goulds Pumps, Inc., Seneca Falls, NY 13148). Choice of a suitable recirculation pump was critical since it must have good net positive suction head (NPSH) characteristics and a mechanical seal that does not leak air. The inlet valve was controlled by a brass float valve which responded to the permeate level. The system was operated for 8 weeks on city water which contained a low dissolved solids concentration with high organic material and colloids. The system operated on a continuous basis filtering water prior to a carbon filter, softener, reverse osmosis (RO) and demineralizer plant which was producing ultrapure water for electronics manufacturing.

The system was set up to operate with continuous recirculation corresponding to a cartridge dP of 13 psi; this equated to a flow of 60 gpm (13.7 m³/hr) approx. for 4 cartridges.

The bleed flow was set for 10% of the feed flow. This gave a nominal recovery of 90%, however taking the losses during "Vacuflush" into account lowered the overall recovery to 86.7%.

The flush cycle was carried out every 30 min and comprised the following sequence:
Forward flush—30 sec.
Reverse flush—30 sec.
Vacuflush—30 sec.

During the forward and reverse flush cycles with an average transmembrane pressure of zero the differential pressure (13 psig) automatically divides either side of atmospheric pressure. This resulted in an inlet pressure of 6.5 psig and an outlet pressure of −6.5 psig.

The system reduced the 15 min. Silt Density Index (SDI) from "not measurable" to <1.0 and eliminated the need to chemically clean the RO membrane which had previously been necessary every 10 days to maintain flux. The normal output was 16 gpm from 4 hollow fiber cartridges with a transmembrane pressure of 4 psig. During the test period no chemical clean was necessary nor was there any sign of membrane fouling which would have caused a steady increase in transmembrane pressure.

Although the invention has been described with regard to its preferred embodiments, which constitute the best mode presently known to the inventors, it should be understood that various changes and modifications as could be obvious to one having ordinary skill in this art may be made without departing from the scope of the invention which is defined in the claims.

I claim:

1. A method of operating a membrane separation system comprising: separately setting the transmembrane and differential recessive sufficient for enabling substantially unrestricted permeate flow by
    a) inducing flow of process fluid through one or more separation modules in a continuous, recirculating loop, said separation modules being submerged in permeate;
    b) introducing fresh process fluid to said loop in response to a lowered level of said permeate.

2. The method of claim 1 further comprising: bleeding a portion of the recirculating process fluid from the high pressure side of said loop, thereby removing suspended solids from said loop.

* * * * *